Patented Sept. 26, 1933

1,928,39[8]

UNITED STATES PATENT OFFICE 1,928,398

PROCESS FOR REMOVING ALL FORMS OF POLLUTING SUBSTANCES FROM LIQUIDS

Oliver M. Urbain, Columbus, Ohio, assignor to Charles H. Lewis, Harpster, Ohio

No Drawing. Application June 20, 1930
Serial No. 462,708

2 Claims. (Cl. 210—2)

The present invention contemplates the provision of a colloid chemical precipitation process which will separate from polluted liquids such as sewage and industrial wastes, substantially one hundred percent of the polluting substances contained therein, including all organic matter in its several forms, that is, normally suspended matter, colloidal matter in dispersion, and the matter in true solution.

It has been recognized that polluting organic substances are present in such liquid sewage in three phases, namely, as suspended matter, as colloidal matter, and as matter in true solution. A complete purification of a liquid requires the elimination therefrom of the organic matter present in each of these forms.

The removal of the normally suspended matter presents no difficulty since it is susceptible of removal, either by filtration or coagulation. Processes have heretofore been proposed for the removal of the colloidal matter, and these processes have met with considerable success, and effected a material purification.

Since the reduction in the bio-chemical oxygen demand is the desideratum of every purification process, it becomes important to eliminate not only the suspended matter and the colloidal matter, but also the matter in true solution, especially in concentrated sewage or like liquids, wherein the true solution fraction of the organic matter increases the ultimate bio-chemical oxygen demand.

This invention accordingly contemplates the provision of a process for removing in a single continuous treatment substantially all of the polluting matter from a liquid, which process embraces the steps of flocculating the colloidal matter to render it susceptible of coagulation adsorbing the organic matter in true solution by an adsorbent agent, also susceptible of coagulation, and finally coagulating the normally suspended matter, the suspended matter formed as a result of the flocculating of the colloid, and the adsorbent carrying the matter adsorbed from true solution.

It is a further and more specific object of the invention to effect the flocculation of the colloids in a more economical and expeditious manner than any heretofore proposed.

Other and further objects of the invention will become apparent as the description of the process is developed.

For the purposes of this specification, the following lines of demarkation between the suspended matter, colloidal matter and matter in true solution will be observed. The suspende[d] matter includes all particles insoluble in th[e] medium, the smallest of which do not exhib[it] the Brownian movement; the colloidal matter i[n]cludes all particles ranging in size from t[he] largest particles which do exhibit the Browni[an] movement to the largest particles of a true sol[u]tion which do not diffuse or dialyze; the matt[er] in true solution comprises the crystaloids whi[ch] diffuse and dialyze.

The relative putrescibility of the different fra[c]tions of the organic matter present in a pollut[ed] liquid is indicated by the percent of the ten d[ay] bio-chemical oxygen demand attributable to ea[ch] fraction. In normal sewage these percentag[es] are about as follows:

Suspended matter____35% of the 10 day B. O. [D.]
Colloidal matter_____53% of the 10 day B. O. [D.]
Dissolved matter_____12% of the 10 day B. O. [D.]

In normal sewages of low concentration, t[he] fraction of organic matter in true solution do[es] not present such a serious problem, particula[r]ly if the suspended fraction and the colloidal fra[c]tion are efficiently removed. However, in co[n]centrated sewage and polluted liquids, many of which have a bio-chemical oxygen demand from 800 to 1200 parts per million, and in so[me] instances of polluted liquids, for example whe[re] a bio-chemical oxygen demand running into se[v]eral thousand parts per million, the true sol[u]tion fraction assumes great importance. Wi[th] such concentrated liquids, a process failing of r[e]moval of the true solution fraction yields an effl[u]ent, having a high bio-chemical oxygen dema[nd] and one which places a heavy burden on the r[e]ceiving stream. It is to the treatment of the concentrated liquids that the instant process h[as] especial application.

Since little difficulty is encountered in the r[e]moval of suspended matter from a liquid, it b[e]comes apparent that if the colloidal matter, a[nd] the matter in true solution can be brought i[n] a state of suspension, it may likewise be remov[ed] with little difficulty. When colloids are floccul[at]ed, they take on the character of suspended m[at]ter, and become susceptible of coagulation.

I have ascertained that it is also possible [to] adsorb from the polluted liquid matter in tr[ue] solution by utilizing an adsorbing agent which [is] susceptible of coagulation. I am able to eff[ect] flocculation of the colloids, as well as adsorpti[on] of the matter in true solution, in the preser[ce] of the suspended matter. It will thus be se[en] that by effecting flocculation of the colloid, a[nd]

adsorption of the matter in true solution, in the presence of the normally suspended matter, all of the organic matter is brought into a state of suspension which can thereafter be readily coagulated by the addition of a suitable coagulent.

To effect the flocculation of the organic colloids present in the polluted liquid, I employ an improved and efficient electrolyte which both ionizes and hydrolizes, namely, ferric chloride. Other efficient electrolytes are cerium chloride, molybdenum chloride, and vanadium chloride. The flocculation is effected by first bringing the liquid to the proper pH in the alkaline range. In such a solution, the colloids are negatively charged. The ferric chloride, in its ionization releases high valent cations. I have found that when ferric chloride is added to the liquid in suitable proportions, and the pH of the solution maintained in the range of from 9.5 to 10, a flocculation of substantially all colloidal matter may be effected. The flocculation of the colloidal matter may be effected in the presence of the suspended matter. In effecting the flocculation, I prefer to bring the solution to a pH of from 9.5 to 10 by the addition of hydrated lime, and to add the electrolyte in the form of $\frac{1}{10}$ mole solution, followed by agitation. The point of complete flocculation may be determined by gravametric methods, or by the nephelometer. By such determinations, the quantity of the electrolyte necessary to effect complete flocculation, may be definitely ascertained for any given liquid.

With respect to the removal of organic matter in true solution by an adsorbent, it will be here stated that the term "adsorption" as used herein means (the concentration in the boundary layers, regardless of the mechanism by which such concentration is brought about).

The problem of adsorption is of course one of surface chemistry, and to facilitate this process it is essential that the adsorbed material be held by the adsorbent, and coagulated therewith.

I have been able to isolate certain adsorbents which have a sufficient active surface and adsorption capacity when used in proper proportion to effect a substantially complete adsorption of the organic matter in true solution from a polluted liquid.

In order to function as an adsorbent in the process, a material must be insoluble in the medium, it must have a very specific active surface, preferably of sufficient fineness to pass a 200 mesh screen, and possess the capacity to lower the surface tension of the liquid. Any material meeting these requirements may be utilized in this process as the adsorbent agent. Exemplary of such materials are carbonaceous shales, and the slag formed in the Bessemer process for manufacturing steel when reduced to the requisite degree of fineness.

Coagulants, suitable for use in the process, are ferrous sulphate, aluminum sulphate, sodium aluminate, chlorinated copperas.

The following is an illustrated mode of carrying out the process of my invention: The alkali in the form of calcium hydroxide may be employed in amount varying from approximately 1000 to 3000 pounds per million gallons of liquid treated. The electrolyte when ferric chloride is used may be employed in amounts varying from 150 to 300 pounds per million gallons. The adsorbent material should be added in amounts varying from 1,000 to 2,500 pounds per million gallons, depending upon the concentration, and percent bio-chemical oxygen demand due to the organic matter in true solution. The coagulent, when ferrous sulphate is employed, for example, may be varied between 100 and 150 pounds per million gallons.

A preferable mode of procedure is to prepare a solution of ferric chloride of known strength, and to introduce this solution to the polluted liquid in pre-determined amount, as determined by prior test. The solution should then be subjected to a short time period of agitation. The alkali in the form of calcium hydroxide is then added, to give the requisite pH range. The adsorbent material may also be added with the alkali, whereupon a second agitation should be effected. The time period of agitation in both instances is relatively short, usually approximately four or five minutes. After the second period of agitation, the solution is preferably passed through a coagulation zone, and the coagulant commingled with the solution by being introduced thereto in a liquid form. An additional short time period of agitation is provided for a complete incorporation of the coagulant. The solution may thereupon be led to a settling basin wherein settling of the precipitate occurs.

The above is only one exemplary mode of procedure. It is to be understood that good results are obtainable by incorporating all of the treating materials in the polluted liquid at one time, and thereafter effected thorough agitation, to facilitate the necessary reactions. By the process herein disclosed, I have been able in the treatment of normal sewage to effect approximately ninety-nine percent reduction in the total ten day bio-chemical oxygen demand of the sewage. It will thus be apparent that the process is effective and efficient in the removal of all forms of polluting organic matter found in sewage and like liquids.

The foregoing specification is illustrative only of my process, and is not to be construed as placing any limitation thereon. The scope of my invention being comprehended in the appended claims.

What I claim my invention is

1. A process for removing organic matter from a polluted liquid comprising adding thereto calcium hydroxide, an electrolyte possessing the capacity to flocculate colloids, a finely divided adsorbent in the form of a carbonaceous shale having an extensive specific active surface, and a coagulant.

2. A process for treating polluted liquids to remove organic matter therefrom comprising initially introducing a quantity of a solution of ferric chloride to the liquid, effecting an agitation thereof, thereafter introducing a quantity of calcium hydroxide and an adsorbent in the form of a finely divided carbonaceous shale having an extensive specific active surface, effecting further agitation, and finally adding a suitable coagulant.

OLIVER M. URBAIN.